Patented June 24, 1930

1,767,319

UNITED STATES PATENT OFFICE

PHILIPP C. H. SIEDLER, OF GRIESHEIM-ON-THE-MAIN, AND EUGEN SCHULTE, OF SCHWANHEIM-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE DISSOCIATION OF SULPHUR VAPOR

No Drawing. Application filed October 1, 1928, Serial No. 309,681, and in Germany October 12, 1927.

Our invention relates to a process of dissociating sulphur vapor.

In certain cases it may be of importance to be able to obtain a sulphur vapor which has dissociated to a greater or less extent into $S_4$ or $S_2$ molecules, instead of the sulphur vapor consisting of $S_8$ molecules which is obtained at the normal boiling point. Such dissociated sulphur vapor is obtainable by heating at a temperature between about 500° to 800° C.

Hitherto the chief obstacle to the production of dissociated sulphur vapor has been the fact that no substance could be found which is sufficiently resistant to the extremely reactive $S_2$-molecules. Not only are metals in general vigorously attacked, but this is also the case with ceramic materials, such as chamotte, porcelain and the like, which are almost or completely stable at temperatures in the neighbourhood of the boiling point of sulphur and which are in use as linings for retorts or for pipes for the transference of heat.

We have now found a substance, namely silicon carbide, which shows in practice an extraordinary superiority as regards utility, being so resistant to sulphur, even when the latter is in the state of $S_2$-molecules, that the transference of heat for the production of sulphur vapor of any desired degree of dissociation is no longer a matter of difficulty. The silicon carbide can be employed in various forms for the transference of heat. It may be in the form of container material (for example linings of metal retorts); or in the form of a rod or tube-shaped heating element, which can be brought to the desired temperature by using it as an electric resistance. The formed resistance masses of this type, as for example those found on the market under the name "Silit", have proved suitable for heating elements of the above-described type.

According to our present invention, therefore, silicon carbide is employed in the dissociation of sulphur vapor, either as container material or as a heating element for the transference of heat to the sulphur vapor to be superheated to, for instance, 500° to 800° C.

We claim:

The process of dissociating sulphur into $S_2$ molecules which comprises imparting heat to the sulphur vapor at a temperature between about 500° and 800° C., the heat being transferred to such vapor mainly by contacting surfaces of silicon carbide.

In testimony whereof we affix our signatures.

PHILIPP C. H. SIEDLER.
EUGEN SCHULTE.